(12) United States Patent
Schmidtpott et al.

(10) Patent No.: US 7,408,110 B2
(45) Date of Patent: Aug. 5, 2008

(54) HOUSING CONTAINING A PASSAGE FOR AN ELECTRICAL CONDUCTOR

(75) Inventors: Heike Schmidtpott, Bad Salzuflen (DE); Michael Hoeing, Lemgo (DE)

(73) Assignee: Weidmüller Interface GmbH & Co. KG, Detmold (DE)

( * ) Notice: Subject to any disclaimer, the term of this patent is extended or adjusted under 35 U.S.C. 154(b) by 161 days.

(21) Appl. No.: 11/409,131

(22) Filed: Apr. 21, 2006

(65) Prior Publication Data
US 2006/0243474 A1    Nov. 2, 2006

(30) Foreign Application Priority Data
Apr. 30, 2005    (DE) .................. 20 2005 006 965 U

(51) Int. Cl.
*H02G 3/08*    (2006.01)
(52) U.S. Cl. .............................. 174/50; 174/58; 174/64; 174/17 R; 439/535; 248/906
(58) Field of Classification Search .................. 174/91, 174/92, 93, 88 R, 77 R, 84 R, 135, 50, 64, 174/58, 60, 17 R, 59; 439/535; 248/906; 361/600
See application file for complete search history.

(56) References Cited

U.S. PATENT DOCUMENTS

| | | | | |
|---|---|---|---|---|
| 5,561,269 A | * | 10/1996 | Robertson et al. | ............... 174/92 |
| 5,574,259 A | * | 11/1996 | Meltsch et al. | ................ 174/91 |
| 6,064,003 A | * | 5/2000 | Moore et al. | ................ 174/662 |
| 6,351,592 B1 | * | 2/2002 | Ehn et al. | ................... 385/135 |

FOREIGN PATENT DOCUMENTS

| | | |
|---|---|---|
| AT | 394 477 B | 4/1992 |
| DE | 32 01 324 A1 | 7/1983 |
| DE | 197 01 511 C2 | 7/1997 |
| DE | 199 07 204 A1 | 8/2000 |
| DE | 101 25 625 A1 | 12/2002 |
| DE | 103 23 080 A1 | 12/2004 |
| DE | 103 33 499 A | 2/2005 |

* cited by examiner

*Primary Examiner*—Dhiru R Patel
(74) *Attorney, Agent, or Firm*—Lawrence E Laubscher, Sr.; Lawrence E Laubscher, Jr.

(57) ABSTRACT

A sealed electrical junction box includes a sectional housing containing a chamber and having an end wall that contains at least one access passage in which is mounted a sealing bush containing a longitudinal through bore. An annular internal sealing rib on the access passage wall cooperates with a corresponding circumferential groove in the outer circumferential surface of the bush, thereby to seal the space between bush and the access passage wall. To seal the space around an inserted conductor, there is mounted on the inner circumferential surface of the bush through bore at least one integral deformable sealing lip that engages the outer circumferential surface of a conductor inserted into the bush longitudinal bore. When the bush is not in use, the longitudinal bore thereof is sealed by a cylindrical plug that is inserted into the longitudinal bore.

14 Claims, 4 Drawing Sheets

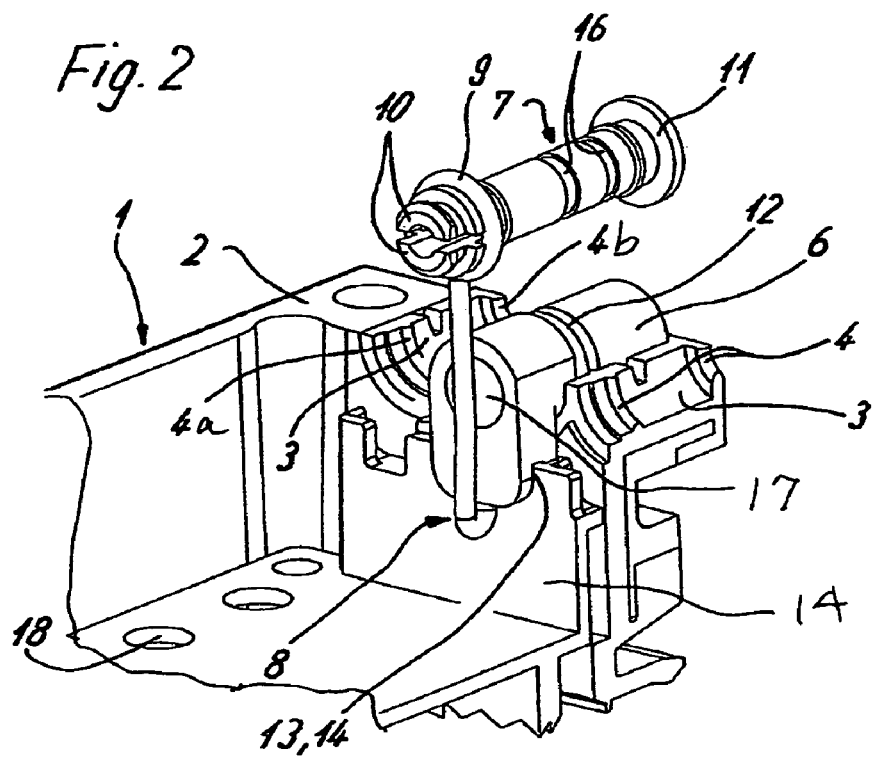
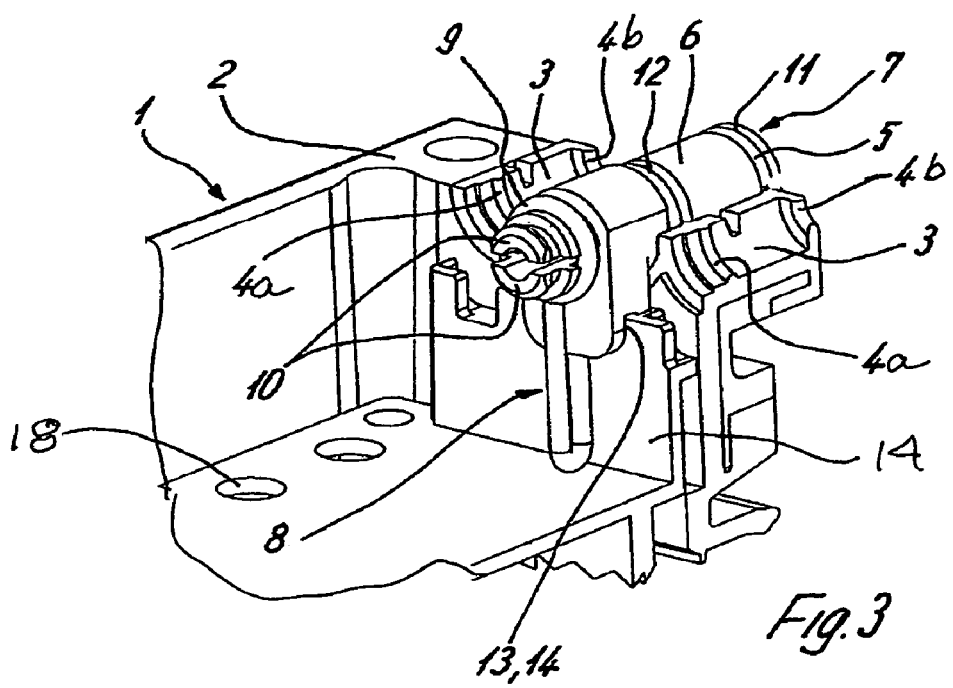

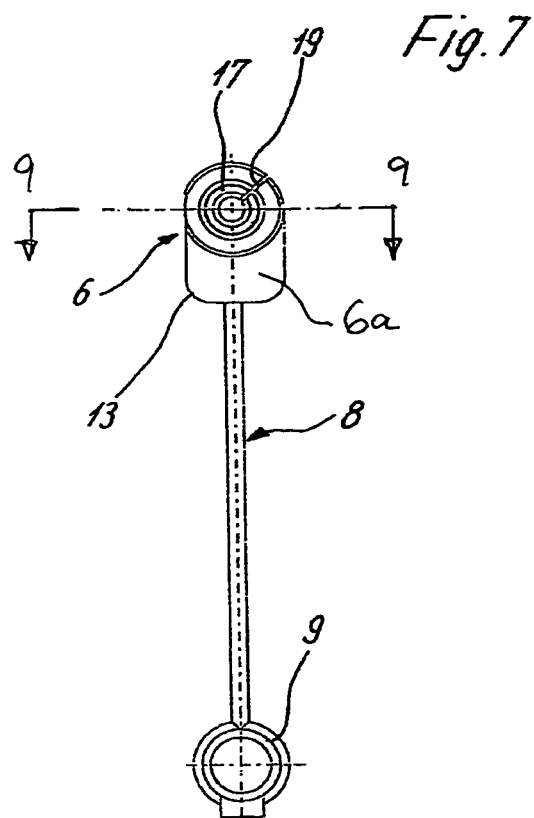
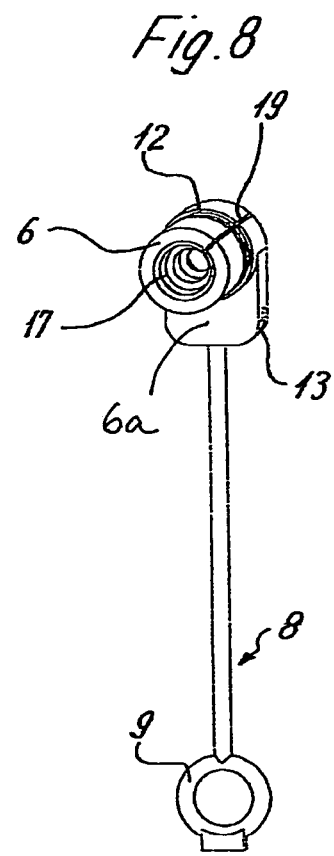
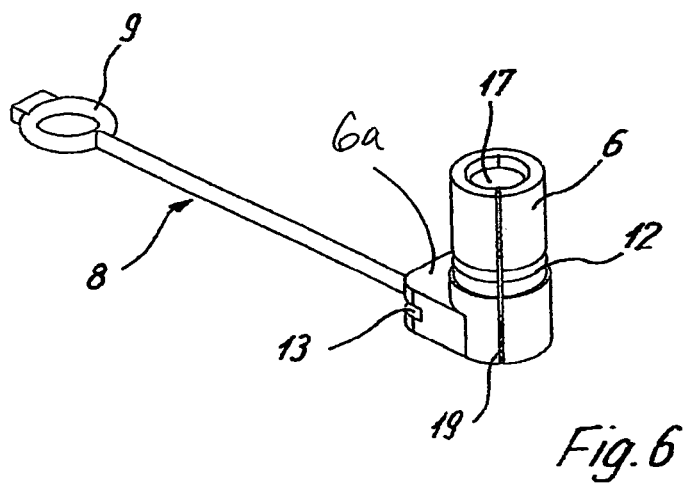

HOUSING CONTAINING A PASSAGE FOR AN ELECTRICAL CONDUCTOR

BACKGROUND OF THE INVENTION

1. Field of the Invention

A sealed electrical junction box includes a sectional housing containing a chamber and including an end wall that contains at least one access opening in which is mounted a sealing bush containing a longitudinal through bore. First annular sealing means seal the space between the bush and the wall of the access opening, and second annular sealing means seal the space between the conductor and the wall of the through bore. When not in use, a closure plug closes the longitudinal bore in the bush.

2. Description of Related Art

Various proposals have been made for sealing electrical junction boxes in which are mounted electrical devices such as switches, relays, printed circuit boards or the like. This is particularly important in hermetically sealed containers that are designed for use in hazardous and/or moisture-laden environments.

The known housings are so designed that the injection-molded sealing ribs will seal the inserted conductor with certain given diameters. If a round conductor with a deviating diameter is to be introduced into the housing, then, until now, it was necessary to use a housing whose lead-in passageway was adapted thereto. Naturally, this calls for a considerable production effort because different housings must be kept in readiness.

The present invention was developed to provide an improved sealed junction box in which all the spaces associated with the conductor lead-in openings are completely sealed.

SUMMARY OF THE INVENTION

Accordingly, a primary object of the present invention is to provide a sealed junction box including a sectional housing containing a chamber and having an end wall provided with at least one access opening, a sealing bush mounted in the access opening, said sealing bush containing a longitudinal through bore through which one end of a conductor is inserted into the housing chamber, at least one first sealing means operable to seal the space between the bush and the access opening, and at least one second sealing means operable to seal the space between the outer surface of the conductor and the through bore wall.

According to another object of the invention, a closure plug is provided for closing the bush longitudinal bore when the bush is not in use. The closure plug is connected against loss relative to the sealing bush by eyelet and strap means.

A further object of the invention is to provide a sectional housing including matching upper and lower parts that cooperate to define a chamber having an end wall containing a plurality of access openings through which conductors are introduced for connection with electrical components contained within the housing chamber. The horizontal dividing plane between the upper and lower sections extends through the access openings. Annular sealing ribs on the walls of the housing access openings extend into corresponding grooves contained in the outer circumferential surface of the sealing bush. Annular sealing ribs on the walls of the housing access openings extend into corresponding grooves contained in the outer circumferential surface of the sealing bush. The electrical conductors extend through longitudinal bores contained in the bushes, the spaces between the walls of the bores and the outer surfaces of the conductors being sealed by deformable integral annular sealing lips provided on the bore walls. Preferably, the lips have different internal diameters in accordance with the outer diameters of various conductors that are to be inserted into the longitudinal bores.

The present invention guarantees that different conductor diameters can—without any problem—be adequately sealed in the access passage of the housing wall. The injection-molded sealing ribs of the access openings of the known housings can seal only conductors with, for example, diameters of 4, 6 and 6.5 mm. On the other hand, by using the sealing bush of the present invention, one can also seal conductors with, for example, a diameter of 2 to 4 mm, preferably 2, 2.4 and 2.9 mm, whereby the 4-mm diameter is sealed here both by the sealing rib of the housing access opening as well as by a corresponding sealing lip of the longitudinal bore of the sealing bush.

The sealing bush is slit longitudinally so that when a thicker conductor is run through, the sealing bush will to some extent be spread open, so that the corresponding sealing lip will rest upon the conductor due to the action of the return forces of the sealing bush. The conductor with the smallest diameter that can be inserted rests with a slighter spread of the sealing bush upon the sealing lip with a smaller inside diameter, whereby the particular sealing lip is firmly pressed upon the inserted conductor by putting the upper part on top of the lower part of the housing and as a result of the corresponding deformation of the sealing bush. When a conductor with a larger diameter is passed through, the sealing lip is deformed with the smallest inside dimension to such an extent the sealing lip, associated with that conductor, will come to rest against it to the full extent.

According to an advantageous feature of the invention, the sealing bush, when not in use, is closed by a closure plug that is inserted into the longitudinal bore. This happens both when the sealing bush is placed in the access opening of the housing while no conductor is as yet run through, and in the case where the sealing bush is not employed and is places at a storage position inside the housing.

At one end, the closure plug includes resilient catch tabs that engage a recess in the housing bottom wall in a form-locking and/or friction-locking manner, so that the unit, made up of plug and sealing bush, will be retained securely. This is particularly advantageous as a securing device during shipment when the housing, including the structural unit made up of plug and sealing bush, is to be delivered.

Furthermore, the plug can be connected with the sealing bush against an accidental loss by means of a safety device, for example, in the form of an eyelet strap that at one end is firmly connected with the sealing bush and that at the other end is attached to the closure plug with an eyelet and which is retained there, for example, in the area of the mentioned catch tabs in a form-locking manner.

If the closure plug is to be inserted as a blind plug into the sealing bush that is inserted in the wall of the housing, then the plug and the sealing bush can be taken out of the recess as a unit without having to pull the eyelet strip off the plug.

To ensure against damage to the sealing lips of the sealing bush, the closure plug has grooves that are circumferentially adapted to the sealing lips, which grooves cover the sealing lips and which simultaneously form a safety device against any shifting motion in the sealing bush.

Furthermore, on the outside, the sealing bush is provided with a circumferential groove into which is inserted the injection-molded sealing rib of the access opening in the position inserted in the housing wall.

BRIEF DESCRIPTION OF THE DRAWINGS

Other objects and advantages of the invention will become apparent from a study of the following specification, when viewed in the light of the accompanying drawing, in which:

FIG. 1a is a right hand end view of the housing including the bottom section of FIG. 1;

FIG. 2 is a detailed perspective view of the housing lower section with the sealing bush in the assembled condition and the closure plug in is disengaged position;

FIG. 3 is a detailed perspective view of the housing lower section with the sealing bush in the assembled condition and with the closure plug in its inserted closed position;

FIG. 5 is a perspective side view of the cylindrical closure plug;

FIGS. 6-8 are perspective views of the sealing bush; and

FIG. 9 is a sectional view of the sealing bush taken along line 9-9 of FIG. 7.

DETAILED DESCRIPTION OF THE INVENTION

Figure 1:
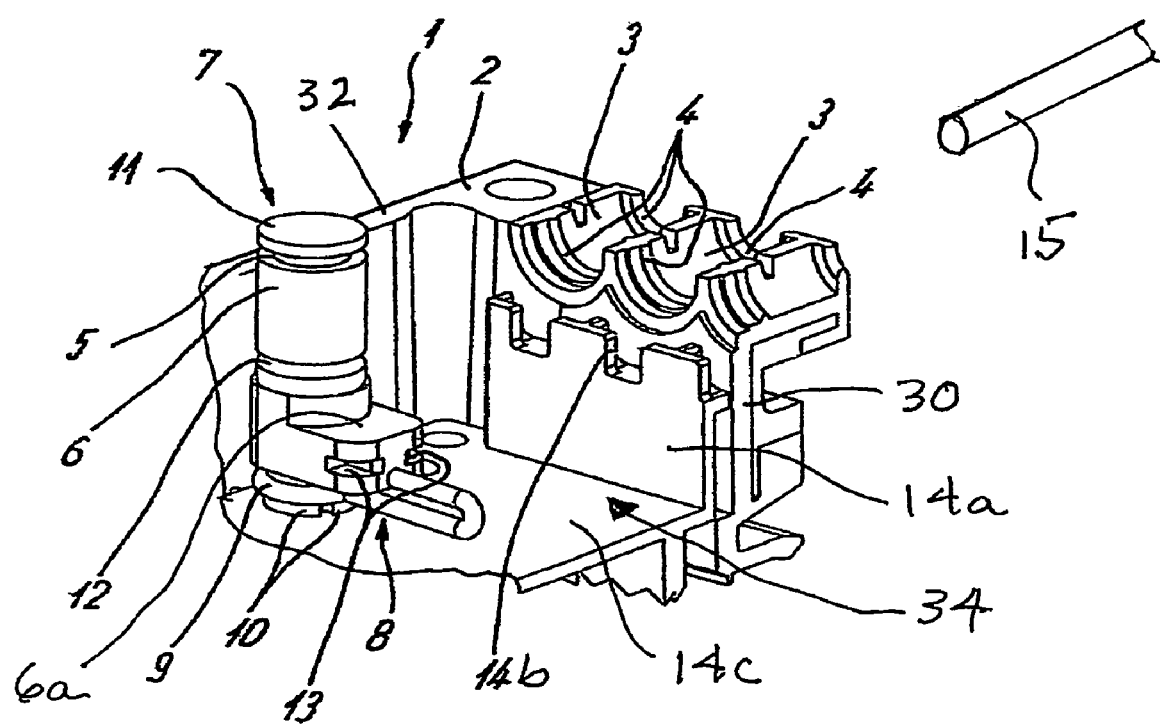
FIG. 1 is a detailed perspective view of the housing lower section with the sealing bush in the disassembled condition.
Figure 4:
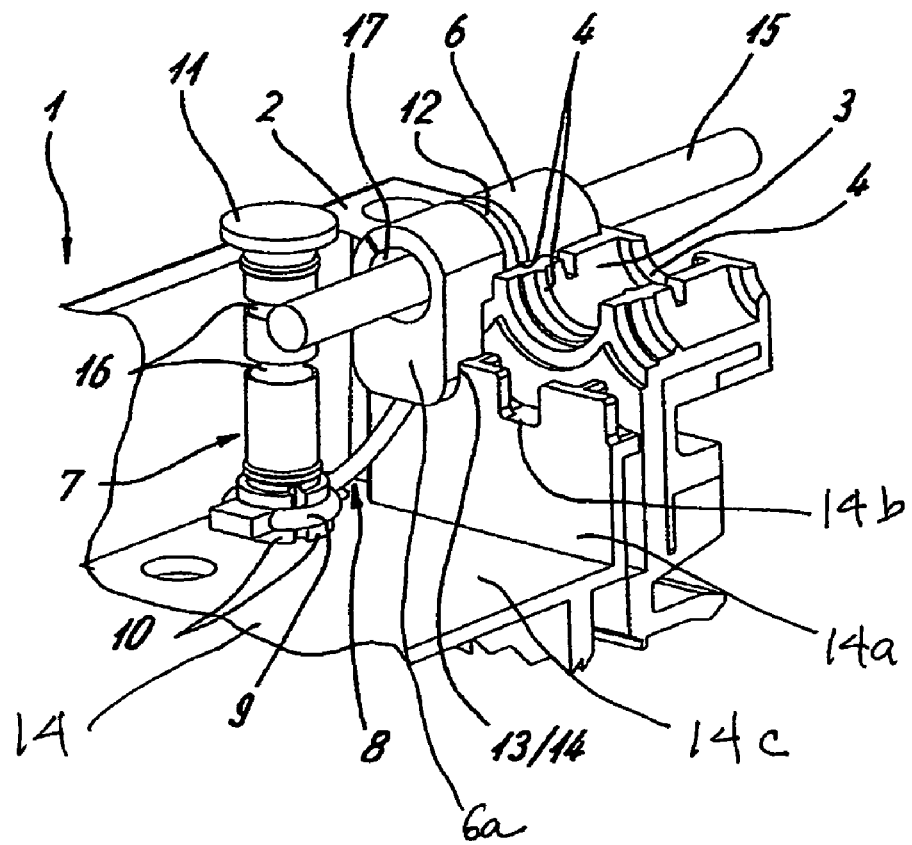
FIG. 4 is a detailed perspective view illustrating an electrical conductor inserted through the bore of the bush and with the closure plug in the stored disengaged position.

Referring first more particularly to FIGS. 1 and 1a, the sealed electrical junction box of the present invention includes a sectional housing 1 having an upper section 102 and a lower section 2. The housing 1 is generally rectangular and contains a chamber 34 that receives electrical components such as switches, actuators, printed circuit boards, or the like. Mounted in the access openings 3 contained in the housing end wall 30 are a plurality of cylindrical sealing bushes 6, as shown in FIGS. 2-4. These bushes contain longitudinal through bores 17 that are adapted to receive the insulated conductors 15 (FIG. 4) that supply electrical power to the components contained within the housing chamber 34.

In accordance with the present invention, three sealing means are provided for sealing the openings that lead to the housing chamber 34. As will be explained in greater detail below, in order to seal the spaces between the cylindrical bushes 6 and the inner walls of the access openings, the access openings are provided with integral annular sealing ribs 4 that extend within corresponding circular grooves 12 contained in the outer peripheries of the cylindrical sealing bushes 6, respectively. Second sealing means are provided for sealing the space between the outer peripheral surface of the conductor 15 and the inner circumferential surface of the through bore 17 contained in the sealing bush 6. As best shown in FIG. 9, the sealing bush 6 is provided with a plurality of longitudinally spaced annular sealing lips 20. The successive sealing lips 20a, 20b, and 20c have progressively increasing diameters, as will be described in greater detail below.

Finally, in order to seal the longitudinal through passages 17 of those sealing bushes that are not in use, closure plugs 7 are provided that are designed for insertion within the longitudinal bores, as shown in FIG. 3.

Referring now to FIG. 6-8, the cylindrical sealing bush 6 is provided at one end with a radially outwardly extending tab portion 6a having a pair of opposed side walls that contain slots 13. Extending from and integrally connected at one end with the tab portion 6a is an eyelet strap 8 that carries at its other end a resilient circular eyelet 9. The sealing bush 6 is formed of a resilient synthetic plastic material and contains a longitudinal slit 19 that extends the length thereof.

Referring now to FIG. 2, when the sealing bush 6 is seated in the semicircular access opening 3 formed in the lower housing section 2, the sealing rib 4 integral with the housing 2 extends within the corresponding annular sealing groove 12 contained in the sealing bush. The tab portion 6a of the sealing bush extends downwardly into the corresponding slot 14b contained in the vertical wall 14a of a bridge member 14 inserted within the housing chamber 34. The slots 13 contained in the side walls of the tab portion 6a of the sealing bush receive the edges of the slot 14b contained in the bridge 14. Thus, the cooperation between the sealing rib 4 and the groove 12 and the edges of the slot 14b and the slots 13 contained in the tab portion 6a prevent axial movement of the cylindrical bush 6 relative to the housing end wall 32.

When the insulated conductor 15 is inserted longitudinally through the bore 17 contained in the sealing bush 6, it will engage the deformable internal sealing lips 20 contained on the inner circumferential wall of the through bore 17, whereupon the space between the outer circumference of the conductor of the inner circumferential surface of the bore 17 will be sealed.

Referring now to FIG. 5, the plug 7 is generally cylindrical and is provided at one end with an enlarged head portion 11. The other end of the plug 7 is bifurcated to support a pair of catch members 10 that are resiliently biased apart. Intermediate its ends, the plug 7 contains a plurality of longitudinally spaced circular grooves 16 that are adapted to receive the corresponding sealing lips 20 contained on the inner circumferential surface of the sealing bush 6. Therefore, in the event that a given cylindrical bush is not in use, the bifurcated end carrying the fastening means 10 of the plug 7 is introduced into the longitudinal through bore 17 of the sealing bush 6, until the enlarged head 11 of the closure plug is adjacent and spaced from the external surface of the end wall of the housing 1, thereby to define an annular gap 5 that receives a second annular sealing rib 4b that is integral with the inner circumferential surface of the access opening 3.

In accordance with another feature of the invention, means are provided for storing and avoiding loss of the plug 7 when not in use. To this end, the snap fastener means 10 provided at the bifurcated end of the plug 7 are adapted for insertion within a storage opening 18 contained in the bottom wall 14c of the bridge 14, as shown in FIGS. 2 and 3. Thus, the plug 7 and the sealing bush 6 may be stored in an assembled condition as shown in FIG. 1, or the plug can be stored merely by itself, as shown in FIG. 4, when the sealing bush is mounted in the access opening 3. Furthermore, the eyelet 9 is adapted for insertion within a corresponding groove 21 contained in the bifurcated end of the plug 7, thereby to connect the plug 7 against loss relative to the sealing bush 6.

In operation, assume that the sealing bush 6 is in the engaged position shown in FIG. 4, and that the plug 7 is in its stored position in engagement with the associated opening 18 contained in the bottom wall of the bridge member 14. Assume also that the upper section 102 is in place, as shown in FIG. 1a. The plug 7 is connected with the sealing bush 6 by means of the eyelet strap 8 and the resilient eyelet 9 which is concentrically arranged in the groove 21 contained in the bifurcated end of the closure plug 7. The annular space between the outer circumference of the insulated conductor 15 and the inner circumferential wall of the through bore 17 is sealed by one or more of the appropriate deformable annular sealing lips 20a, 20b, and 20c. Furthermore, the space between the outer circumference of the sealing bush and the inner circumference of the access opening is sealed by the cooperation of the ribs 4a and 4b in the groove 12 and in the gap 5, respectively. Any non-used sealing bush provided in an access opening 3 is sealed by means of the insertion of the associated plug 7 within the longitudinal bore 17 of the non-used sealing bush.

Thus, the plug and the sealing bush may be initially transported in the disassembled transport condition of FIG. 1 with the fastening means 10 of the plug inserted within the corresponding opening 18 contained in the bottom wall 14c of the bridge member 14. When the sealing bush is in the engaged position of FIG. 4, the plug is in the stored condition of FIG. 4.

The longitudinal slit 19 is provided so that a conductor can easily be passed through the longitudinal bore of the sealing bush. This longitudinal slit is extended radially inwardly from the outside up to the passage opening 17 and over the entire length of sealing bush 6 so that, depending upon the diameter of the inserted conductor 15, the legs of the sealing bush 6, formed in this fashion, will be spread apart more or less and so that the associated sealing lip will come to rest upon conductor 15 in a sealing manner. By twisting the upper part together with the lower part 2, the sealing sleeve 6 that usually consists of a resilient synthetic plastic substance is so pressed together that the corresponding deformable sealing lip 20 will rest tightly upon the conductor 15.

While in accordance with the provisions of the Patent Statutes the preferred forms and embodiments of the invention have been illustrated and described, it will be apparent to those skilled in the art that changes may be made without deviating from the invention described above.

What is claimed is:

1. An electrical junction box for receiving an electrical component, comprising:
   (a) a generally rectangular hollow housing (1) having a pair of opposed parallel spaced vertical housing end walls (30) and a pair of opposed parallel spaced housing side walls (32) cooperating to partially define a chamber (34), one of said housing end walls containing at least one horizontal access passage (3) having a generally circular cross-sectional configuration, said housing being sectional and including upper(102) and lower (2) sections defined by a horizontal plane passing through said access passage; and
   (b) a cylindrical sealing bush (6) mounted horizontally in and extending through said access passage, said bush being formed from a resilient electrically insulating synthetic plastic material and containing a longitudinal through bore (17), said bore having an inner circumferential wall surface upon which is mounted at least one integral annular elastically deformable sealing lip (20) having a given diameter, whereby when one end of an electrical conductor (15) having an outer diameter corresponding generally with said given diameter is inserted into said chamber via said through bore, said sealing lip will come into sealing engagement with the outer circumferential surface of the conductor, thereby to seal the housing chamber.

2. An electrical junction box as defined in claim 1, wherein a plurality of said integral sealing lips are provided in longitudinally spaced relation on said bush longitudinal through bore wall surface, said sealing lips having different internal diameters adapted for sealing engagement with conductors having corresponding different external diameters, respectively.

3. An electrical junction box as defined in claim 2, wherein said bush contains throughout its length a longitudinal slit (19).

4. An electrical junction box as defined in claim 3, wherein said sealing bush is twistable about its longitudinal axis to cause at least one of said sealing lips to engage the outer peripheral surface of the associated conductor.

5. An electrical junction box as defined in claim 1, wherein said access passage includes at least one internal annular sealing rib (4) adapted to extend into a corresponding annular groove (5) contained in the outer circumferential surface of said bush, thereby to seal the opening around the bush and prevent longitudinal displacement of said bush relative to said one housing end wall.

6. An electrical junction box as defined in claim 5, and further including:
   (c) a bridge member (14) arranged in said chamber, said bridge member having a vertical end wall (14a) adjacent said one housing end wall, said bridge end wall having an upper edge portion that terminates adjacent said access opening, said upper edge portion containing a locking slot (14b);
   (d) said bush including a tab portion (6a) that extends radially outwardly and vertically downwardly from one end of said bush for insertion within said locking slot, said tab portion including wall surfaces that contain locking recesses (13) that receive the edges of said bridge member locking slot, thereby to lock said bush against longitudinal displacement relative to said bridge member end wall.

7. An electrical junction box as defined in claim 5, wherein said one housing end wall contains a plurality of access openings; wherein a plurality of said bushes are mounted in said access openings, respectively; and further including:
   (c) closure plug means including a cylindrical closure plug (7) operable from a disengaged position to an engaged position relative to one of said bushes, said closure plug in said engaged position being inserted into a given longitudinal through bore contained in one of said bushes, thereby to close said given longitudinal through bore.

8. An electrical junction box as defined in claim 7, wherein said closure plug includes an outer cylindrical surface that contains a plurality of longitudinally spaced grooves (16) for receiving said sealing ribs, respectively.

9. An electrical junction box as defined in claim 7, wherein said closure plug includes at one end an enlarged head portion (11) that is adapted for sealing engagement with the adjacent outer end surface of said one bush when said plug is inserted within said one bush longitudinal through bore.

10. An electrical junction box as defined in claim 9, and further including:
    (d) support means for supporting said closure plug on said housing when said closure plug is in the disengaged position, said support means including fastening means (10) carried by the other end of said closure plug for insertion within a storage opening (18) contained in said housing.

11. An electrical junction box as defined in claim 10, and further including:
    (e) means connecting said closure plug against loss relative to said bush.

12. An electrical junction box as defined in claim 11, wherein said connecting means comprises;
    (1) an eyelet strip (8) connected at one end with said bush; and
    (2) a resilient eyelet (9) connected with the other end of said eyelet strip, said eyelet containing an eyelet opening, said closure plug containing on its out surface adjacent one end thereof a circumferential retaining groove (16) receiving said eyelet.

13. An electrical junction box as defined in claim 12, wherein said retaining groove is contained in the end of said closure plug adjacent said fastening means.

14. An electrical junction box as defined in claim 5, wherein a sealing rib is provided at each end of said access opening.

* * * * *